United States Patent
Wilson

[15] 3,639,772
[45] Feb. 1, 1972

[54] IGNITION SWITCHING DEVICE

[72] Inventor: Zade Wilson, 11105 Belsay, Flint, Mich. 48506

[22] Filed: Apr. 13, 1970

[21] Appl. No.: 27,648

[52] U.S. Cl...................................307/10, 180/114, 340/64
[51] Int. Cl. ............................................................H02g 3/00
[58] Field of Search......................307/10 AT, 10; 180/114; 340/63, 64

[56] References Cited

UNITED STATES PATENTS 3,136,307   6/1964   Richard............................307/10 AT
3,387,259   6/1968   Oliva................................307/10 AT

*Primary Examiner*—Herman J. Hohauser
*Attorney*—Hauke, Gifford and Patalidis

[57] ABSTRACT

An ignition switch for vehicles and the like having a housing with a rotatable lock cylinder disposed therein and movable in response to a key adapted to be inserted therein to open and close a first electrical circuit adapted to connect an ignition coil to a power source. A pair of electrical solenoids mounted on the housing are respectively operable to open and close a second electrical circuit adapted to separately connect the ignition coil to the power source, one of the solenoids being responsive to the movement of the rotatable lock cylinder, the other solenoid having means responsive to the removal of the key from the rotatable lock cylinder to energize the same.

20 Claims, 8 Drawing Figures

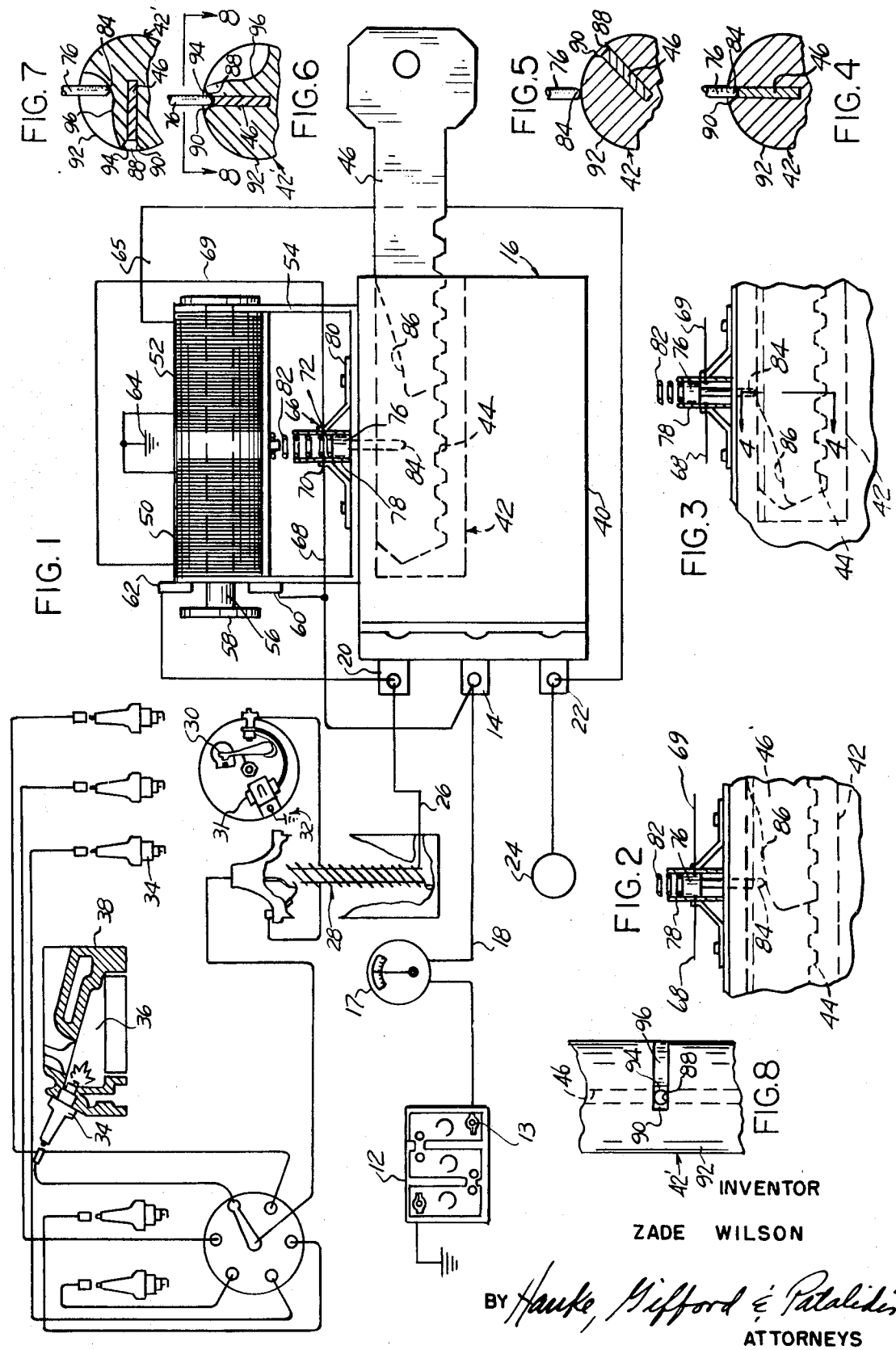

IGNITION SWITCHING DEVICE

BACKGROUND OF THE INVENTION

1. Field of the Invention

The present invention relates to ignition switching devices, and in particular to an improvement in ignition switches for automobiles and similar vehicles of the type which prevent the engine from being turned off until the key has been removed from the ignition switch.

2. Description of the Prior Art

Heretofore, conventional key-operated switches for the ignition circuits of automobiles and the like have been so arranged that the ignition circuit has been turned "on" or "off" by rotating the key after the same has been inserted into the switch. In such conventionally used ignition switches, the ignition circuit may be broken and the motor is stopped while the key is still inserted in the ignition switch. The automobile may be easily stolen if the operator negligently leaves the ignition keys in the automobile.

Improved key-operated switches for the ignition circuits of automobiles have been provided which are so arranged that the key must be removed to break the circuit and stop the engine to thereby prevent the negligent leaving of the ignition keys in an automobile, however such improved switches are not simple in their construction and are not adapted for use with existing conventional key-operated switches. It would therefore be desirable to provide a new and improved switching device which is simple and inexpensive to manufacture and which is adaptable for use with existing conventional key-operated switches.

SUMMARY OF THE INVENTION

The present invention, which will be described subsequently in greater detail, comprises an ignition switching device having a housing with a rotatable lock cylinder disposed therein and movable between selected positions by an ignition key inserted therein. A second switch, radially displaced from the rotatable lock cylinder, is actuated between an open and closed position by a pair of electrical solenoids, one of which is energized in response to a predetermined positioning of the lock cylinder after the key has been inserted therein. Energizing of this electrical solenoid activates its associated switch so as to close an electrical circuit between a power source and the ignition coil of the automobile. A movable contact mounted on the housing is radially displacable toward and away from the lock cylinder in response to the removal and insertion of the ignition key within the locked cylinder and is so arranged as to energize the other solenoid to thereby break the circuit between the power source and the ignition coil upon removal of the ignition key from within the lock cylinder.

It is therefore an object of the present invention to provide a simply constructed, inexpensive key-operated switch for the ignition circuit of automobiles or the like which will break the ignition circuit and stop the engine only upon removal of the ignition key therefrom, thus minimizing the possibility of operation of the vehicle by unauthorized persons.

Still another object of the present invention is to provide an ignition switching device that may be used with existing automobile switches with little modification thereto so as to provide them with the above-mentioned advantages.

Other objects, advantages and applications of the present invention will become apparent to those skilled in the art of ignition switching devices when the accompanying description of an example of the best mode contemplated for practicing the invention is read.

BRIEF DESCRIPTION OF THE DRAWING

The description herein makes reference to the accompanying drawing wherein like reference numerals refer to like parts and in which:

FIG. 1 is a schematic illustration of an automotive ignition circuit incorporating the principles of the present invention;

FIG. 2 is a fragmentary enlarged view of the switching device illustrated in FIG. 1 with the ignition key partially inserted therein;

FIG. 3 is a fragmentary enlarged view of the switching device illustrated in FIG. 1 with the ignition key fully inserted therein;

FIG. 4 is a fragmentary cross-sectional view of the switching device illustrated in FIG. 3 taken on line 4—4 thereof;

FIG. 5 is a fragmentary cross-sectional view similar to FIG. 4 with the lock cylinder rotated by a predetermined amount;

FIG. 6 is a fragmentary cross-sectional view of a modified form of the lock cylinder illustrated in FIG. 4;

FIG. 7 is a fragmentary cross-sectional view similar to FIG. 6 with the lock cylinder rotated by a predetermined amount; and FIG. 8 is a fragmentary view of a lock cylinder taken on line 8—8 of FIG. 6.

DESCRIPTION OF THE PREFERRED EMBODIMENT

Referring to the drawing, and particularly to FIG. 1 wherein there is illustrated an example of the present invention in the form of an ignition system generally indicated by the numeral 10. The ignition system 10 comprises a power source, such as a direct current battery 12, the positive terminal 13 of which is connected to the input terminal 14 of a switching device 16 by a wire 18. A conventional ammeter 17 is connected in series with the battery 12 and the switching device 16 by a wire 18. The switching device 16 has two output terminals 20 and 22, the latter being connected to a conventional starter motor, which is schematically illustrated at 24. The output terminal 20 of the switching device 16 is connected by a wire 26 to the primary winding of an ignition coil 28, which in turn is connected to conventional distributor breaker points 30 and a capacitor 31, which in turn are grounded at 32. The ignition coil 28 has a secondary winding which is connected to a rotor (not shown) within the distributor, which in turn is adapted to successively direct electrical power to spark plugs 34 to generate a spark at each plug so as to ignite a fuel-air mixture in a combustion chamber 36 of an engine 38. Since the battery 12, the ammeter 17, the starter motor 24, the ignition coil 28, the distributor breaker points 30, the capacitor 31, the spark plugs 34, and the engine 38 are all conventional devices and are all connected in the conventional manner, no further detailed description of them is deemed necessary.

The switching device 16 comprises a housing 40 which may be of any suitable form for use on the instrument panel (not shown) of an automobile. The housing 40 has a conventional lock cylinder 42 disposed therein which includes tumblers 44 movable in response to an ignition key 46 which is adapted to be inserted into and removed from the lock cylinder 42. The lock cylinder 42 is of the conventional type having three positions: an "off" position, an "on" position in which internal switch contacts (not shown) within the housing 40 connect the input terminal 14 to the output terminal 20, thereby connecting the ignition coil 28 to the battery 12; and a third position in which internal contacts (not shown) are connected to establish an electrical connection between the input terminal 14 and the output terminal 22 so as to direct current from the battery 12 to the starter motor 24. Normally, the lock cylinder 42 is spring biased to the "on" position when the same has been rotated to the third position and as soon as the engine 38 is started by the starter motor 24 the key and the lock cylinder are normally held in the "on" position; all of which is well known in the field of ignition switch construction.

A pair of axially aligned electrical solenoids 50 and 52 are mounted to the housing 40 by a bracket 54 and have a common armature 56, the outer end of which forms a movable contact 58. Fixed contacts 60 and 62 are connected electrically in parallel with the first-mentioned internal switching contacts of the switching device 16. The movable contact 58 is so arranged that the same will engage the contacts 60 and 62 and close their associated circuit when the solenoid 52 is energized and will disengage from the contacts 60 and 62 and break their associated circuit when the solenoid 50 is energized. Both solenoids 50 and 52 are grounded at 64.

It can be seen from FIG. 1 that solenoid 52 is connected to the output terminal 22 of a switching device 16 by means of wire 65. Thus when the key 46 is inserted into the lock cylinder 42 and the key is rotated to the third position, hereinbefore described, the internal contacts within the switching device 16 will connect the direct current from the battery 12 through the input terminal 14 to both the starter motor 24 and the solenoid 52. During this momentary electrical connection while the engine of the vehicle is being started, the solenoid 52 will be energized to cause the movable contact 58 to be shifted to the right as viewed in FIG. 1 and into engagement with the fixed contacts 60 and 62 and thus current is directed to the ignition coil 28 by the wire 26. At the same time, the first-mentioned internal contacts of the switching device 16 are also closed, thus both parallel circuits are closed to facilitate a supply of direct current to the ignition coil 28. Since these parallel circuits are both directing current to the ignition coil 28, the engine will not stop when the lock cylinder is rotated by the key 46 to the "off" position as the current will still be directed to the ignition coil 28 via the contacts 60 and 62. In order to stop the engine, the solenoid 50 must be energized to cause the movable contact 58 to disengage from fixed contacts 60 and 62.

The solenoid 50 is energized by means of a switch 66 which is adapted to direct current from the battery 12 to the solenoid 50 through lead wires 68 and 69, which respectively connect a fixed contact 70 of the switch 66 to the input terminal 14 and a fixed contact 70 of the switch 66 to the solenoid 50. The fixed contacts 70 and 72 of the switch 66 are normally maintained in an open position. The switch 66 further comprises an insulated tubular guide 78 supported by a bracket 80. The fixed contacts 70 and 72 mounted on the inner surface of the tubular guide 78 are adapted to be momentarily engaged by a movable contact 76 as the same moves up and down within the interior of the tubular guide 78. The movable contact 76 is normally biased toward the lock cylinder 42 by means of a spring 82 which is carried by the bracket 54 under the solenoids 50 and 52. As can be seen in FIG. 1, when the key 46 is removed from the lock cylinder 42, the spring 82 normally biases the inner end 84 of the movable contact 76 into the lock cylinder 42. When the key 46 is fully inserted into the lock cylinder 42, a cam surface 86 at the forward end of the key 46 engages the inner end 84 of the movable contact 76 and urges the contact 76 radially outwardly with respect to the lock cylinder 42. As the movable contact 76 is radially displaced within the tubular guide 78, it engages the fixed contacts 70 and 72 (as illustrated in FIG. 2) thus momentarily closing the circuit between the battery 12 and the solenoid 50, thereby momentarily energizing the solenoid 50, which in turn urges the movable contact 58 to be shifted to the left, as viewed in FIG. 1, to disengage from the fixed contacts 60 and 62. As will be seen hereinafter, energizing of the solenoid 50 during the initial insertion of the key 46 in the lock cylinder 42 provides no function as the movable contact 58 is normally disengaged from the fixed contacts 60 and 62 during such initial insertion of the key 46.

When the key 46 is fully inserted in the lock cylinder 42 at the position illustrated in FIG. 3, the movable contact 76 is positioned above the fixed contacts 70 and 72 and thus when the key 46 is fully inserted the circuit between the battery 12 and the solenoid 50 is open.

Referring to FIGS. 4 and 5, it can be seen that during insertion of the key 46 into the lock cylinder 42 the inner end 84 of the movable contact 76 is positioned within an aperture 88 extending through the outer periphery of the lock cylinder 42. The lock cylinder 42 has a cam surface 90 on one sidewall of the aperture 88 which causes the inner end 84 of movable contact 76 to be shifted out of the aperture 88 and onto the outer surface 92 of the lock cylinder 42 as the same is rotated from its "off" position to its "on" position, as illustrated in FIG. 5.

When the engine 38 is running and the lock cylinder 42 is in the position illustrated in FIG. 5, the lock cylinder functions in a manner which is similar to that of a conventional ignition switch in that current is directed from the battery 12 to the ignition coil 28 by means of the terminal 14, the first-mentioned internal contacts of the switching device 16 and the output terminal 20. As hereinbefore mentioned, when the engine 38 is initially started, current is directed to the solenoid 52 through the outlet terminal 22 to cause the movable contact 58 to engage the fixed contacts 60 and 62, thus both the first-mentioned internal contacts of the switching device 16 and the fixed contacts 60 and 62 are electrically connected in parallel and thus both are directing current from the battery 12 to the ignition coil 28.

When the engine 38 is to be turned "off," the key 46 is rotated counterclockwise to turn the lock cylinder 42 to its initial "off" position, as illustrated in FIG. 4. Movement of the lock cylinder 42 to its initial "off" position disengages the first-mentioned internal contacts within the switching device 16, thereby closing the current path between the battery 12 and the ignition coil 28 via the input terminal 14 and the output terminal 20. Current, however, is still directed from the battery 12 to the ignition coil 28 by means of the closed circuit through fixed contacts 60 and 62 and movable contact 58. Thus, even though the cylinder lock 46 has been turned to the "off" position, the motor 38 continues to run as current is still being directed to the ignition coil 28.

In order for the engine 38 to be stopped, the solenoid 50 must be energized so as to cause disengagement of the movable contact 58 from the fixed contacts 60 and 62, thereby opening the circuit between the battery 12 and the ignition coil 28. This is accomplished by removing the key 46 from the lock cylinder 42. As the key 46 is withdrawn from the lock cylinder 42, the spring 82 urges the movable contact 76 into the lock cylinder 42. The cam surface 86 extending along the forward end of the key 46 controls the rate at which the movable contact 76 will traverse the fixed contacts 70 and 72 within the switch 66. As the movable contact 76 engages the fixed contacts 70 and 72 within the switch 66, the circuit between the battery 12 and a solenoid 50 will be momentarily closed, thereby energizing the solenoid 50 and thus causing the movable contact 58 to be shifted to the left as viewed in FIG. 1 to disengage fixed contacts 60 and 62 and open the circuit between the battery 12 and the ignition coil 28, thus stopping the engine 38.

It is customary in presently used switching devices to provide internal contacts within the switching device which permits the operator of the vehicle to connect the various accessories carried by the vehicle to the battery without the necessity of turning the vehicle engine on. In order to permit the use of such accessories, the switching device 16 may be easily modified.

Referring to FIGS. 6 and 7 for a detailed description of a modification to the switching device 16, there is illustrated the lock cylinder 42' which is similar to the lock cylinder 42 illustrated in FIGS. 4 and 5 with the additional features of a second cam surface 94 formed within the aperture 88 opposite the cam surface 90. Circumferentially spaced from the cam surface 94 there is provided a second cam surface 96 extending into the lock cylinder 42' a sufficient distance to permit the end 84 of the movable contact 76 to be displaced radially inward into the lock cylinder 42' such that the movable contact 76 will traverse the fixed contacts 70 and 72 within the switch 66, thereby causing the engine to be turned off in the same manner as hereinbefore described.

As can be seen in FIG. 6, if the engine 38 is running and the key 46 is within the ignition switch 16, the engine 38 will not turn off until the key has been removed therefrom. By rotating the key in a counterclockwise direction to the position illustrated in FIG. 7, it can be seen that the end 84 of the movable contact 76 will be forced out of the aperture 88 by the cam surface 94, following the contour of the cam 96 until the movable contact 76 has been displaced a sufficient distance to make contact with the fixed contacts 70 and 72.

Thus, it can be seen that the present invention has provided a new and improved switching device usable with an ignition switch in which the ignition key must be removed therefrom before the engine can be turned "off," thus the negligent leaving of the ignition keys in automobiles or the like and the stealing of such automobiles which might result in such practice will be rendered impossible.

While the form of the embodiment of the present invention constitutes one preferred form, it is to be understood that other forms might be adapted, all coming within the scope and spirit of the claims which follow.

What is claimed is:

1. An ignition switching device comprising:
   a housing;
   a rotatable lock cylinder disposed therein and movable in response to a key adapted to be inserted therein;
   a first electrical circuit;
   a first switching means operable to close and open said first electrical circuit in response to a predetermined positioning of said lock cylinder when said key is inserted therein;
   a second electrical circuit;
   a second switching means comprising a fixed contact and a movable contact, said second electrical circuit being respectively closed and opened by engagement and disengagement of said contacts;
   actuating means operable to actuate said second switching means to close and open said second electrical circuit, said actuating means being an electromagnetic means connected to said movable contact and operable to cause engagement with said contacts when said first electrical circuit is closed; and
   third switching means responsive to the removal of said key from said lock cylinder to activate said actuating means to open said second electrical circuit.

2. The ignition switching device as defined in claim 1, wherein said electromagnetic means comprises first and second electric solenoids, the armatures of which are connected to said movable contact, said first electric solenoid being adapted to cause engagement of said contacts when said first electric circuit is closed, and said second electric solenoid being adapted to cause disengagement of said contacts in response to said third switching means.

3. The ignition switching device as defined in claim 2, wherein said first and second electric solenoids are axially aligned and have a common armature connected to said movable contact.

4. An ignition switching device comprising:
   a housing;
   a rotatable lock cylinder disposed therein and movable in response to a key adapted to be inserted therein;
   a first electrical circuit;
   a first switching means operable to close and open said first electrical circuit in response to a predetermined positioning of said lock cylinder when said key is inserted therein;
   a second electrical circuit;
   a second switching means;
   actuating means operable to actuate said second switching means to close and open said second electrical circuit, said actuating means being operable to close said second electrical circuit when said first electrical circuit is closed; and
   third switching means responsive to the removal of said key from said lock cylinder to activate said actuating means to open said second electrical circuit, said third switching means comprising a fixed contact and a movable contact adapted to connect said actuating means with a power source when said contacts are engaged, said contacts being carried by said housing, said movable contact engaging said fixed contact in response to the removal of said key from said lock cylinder.

5. The ignition switching device as defined in claim 4 wherein said second switching means comprises a fixed contact and a movable contact, said second electrical circuit being respectively closed and opened by engagement and disengagement of said contacts, said actuating means comprising first and second electrical solenoids, the armatures of which are connected to said movable contact, said first electrical solenoid being adapted to cause engagement of said contacts when said first electrical circuit is closed, and said second electric solenoid being adapted to cause disengagement of said contacts in response to said third switching means.

6. The ignition switching device as defined in claim 4, wherein said fixed contact is radially displaced from said lock cylinder, said movable contact being radially displacable toward and away from said lock cylinder respectively as said key is removed and inserted in said lock cylinder; and means for radially displacing said movable contact towards said lock cylinder when said key is removed, said movable contact engaging said fixed contact during said last-mentioned radial displacement.

7. The ignition switching device as defined in claim 6, wherein said movable contact is radially displaced from said locking chamber by engagement with said key; and including means biasing said movable contact member toward said lock cylinder.

8. The ignition switch as defined in claim 7, wherein insertion of said key in said lock cylinder radially displaces said movable contact radially beyond said fixed contact, and said biasing means causes said movable contact to be radially displaced toward said lock cylinder to momentarily contact said fixed contacts to connect said actuating means with said power source upon removal of said key from said lock cylinder.

9. The ignition switch as defined in claim 8, wherein said lock cylinder is rotatable from a first position to a second position to close said first switching means, said lock cylinder being rotatable to a third position from said first position in a direction opposite said second position, said lock cylinder having a recess formed therein at said third position, said biasing means radially displacing said movable contact into said recess when said lock cylinder is rotated to said third position, whereby said movable contact momentarily contacts said fixed contact to connect said actuating means with said power source while said key is inserted in said lock cylinder.

10. The ignition switch as defined in claim 7, wherein said biasing means comprises a spring urging said movable contact member toward said lock cylinder.

11. The ignition switch as defined in claim 10 including a support member mounted to said housing and said support member having a bore extending therethrough in which said movable contact is slidably mounted, said fixed contact being disposed on a point in said bore and adapted to be engaged by said movable contact as said movable contact slides up and down said bore, said movable contact being radially displaced above said fixed contact in said bore when said key is inserted within said lock cylinder, and said movable contact being radially displaced below said fixed contact when said key is withdrawn from said lock cylinder, said movable contact contacting said fixed contact momentarily during its movement from above to below said fixed contact.

12. The ignition switching device as defined in claim 5 wherein said first and second electrical solenoids are axially aligned and have a common aperture connected to said movable contact.

13. An ignition switching device comprising:
   a housing;
   a rotatable lock cylinder disposed therein and movable in response to a key adapted to be inserted therein;
   a first electrical circuit comprising a source of electrical power and an engine ignition means;
   a first switching means operable to close and open said first electrical circuit in response to a predetermined positioning of said lock cylinder when said key is inserted therein, said first electrical circuit being opened by said first switching means when said key positions said lock cylinder in a manner which permits withdrawal of said key from said lock cylinder;

a second electrical circuit in parallel arrangement with said first electrical circuit and adapted to connect said source of electrical power to said engine ignition means;

a second switching means comprising a fixed contact and a movable contact, said second electrical circuit being respectively closed and opened by engagement and disengagement of said contacts;

actuating means operable to actuate said second switching means to close and open said second electrical circuit, said actuating means being an electromagnetic means connected to said movable contact and operable to cause engagement with said contacts when said first electrical circuit is closed; and third switching means responsive to the removal of said key from said lock cylinder to activate said actuating means to open said second electrical circuit.

14. The ignition switching device as defined in claim 13, wherein said third switching means comprises a fixed contact and a movable contact adapted to connect said actuating means with a power source when said contacts are engaged, said contacts being carried by said housing, said movable contact engaging said fixed contact in response to the removal of said key from said lock cylinder.

15. The ignition switching device as defined in claim 14, wherein said fixed contact is radially displaced from said lock cylinder, said movable contact being radially displacable toward and away from said lock cylinder respectively as said key is removed and inserted in said lock cylinder; and means for radially displacing said movable contact towards said lock cylinder when said key is removed, said movable contact engaging said fixed contact during said last-mentioned radial displacement.

16. The ignition switching device as defined in claim 15, wherein said movable contact is radially displaced from said locking chamber by engagement with said key; and including means biasing said movable contact member toward said locked cylinder.

17. The ignition switch as defined in claim 16, wherein insertion of said key in said lock cylinder radially displaces said movable contact radially beyond said fixed contact, and said biasing means causes said movable contact to be radially displaced toward said lock cylinder to momentarily contact said fixed contacts to connect said actuating means with said power source upon removal of said key from said lock cylinder.

18. The ignition switch as defined in claim 17, wherein said lock cylinder is rotatable from a first position to a second position to close said first switching means, said lock cylinder being rotatable to a third position from said first position in a direction opposite said second position, said lock cylinder having a recess formed therein at said third position, said biasing means radially displacing said movable contact into said recess when said lock cylinder is rotated to said third position, whereby said movable contact momentarily contacts said fixed contact to connect said actuating means with said power source when said key is inserted in said lock cylinder.

19. The ignition switch as defined in claim 16, wherein said biasing means comprises a spring urging said movable contact member toward said lock cylinder.

20. The ignition switch as defined in claim 18 including a support member mounted to said housing and said support member having a bore extending therethrough in which said movable contact is slidably mounted, said fixed contact being disposed on a point in said bore and adapted to be engaged by said movable contact as said movable contact slides up and down said bore, said movable contact being radially displaced above said fixed contact in said bore when said key is inserted within said lock cylinder, and said key being radially displaced below said fixed contact when said key is withdrawn from said lock cylinder, said movable contact contacting said fixed contact momentarily during its movement from above to below said fixed contact.

* * * * *

UNITED STATES PATENT OFFICE
CERTIFICATE OF CORRECTION

Patent No. 3,639,772   Dated February 1, 1972

Inventor(s) Zade Wilson

It is certified that error appears in the above-identified patent and that said Letters Patent are hereby corrected as shown below:

Column 3, line 31, after "contact", delete the numeral "70" and insert therefor --72--.

Signed and sealed this 20th day of June 1972.

(SEAL)
Attest:

EDWARD M. FLETCHER, JR.   ROBERT GOTTSCHALK
Attesting Officer         Commissioner of Patents